(No Model.)
W. S. MALLARD.
FRUIT PICKER.
No. 355,941. Patented Jan. 11, 1887.
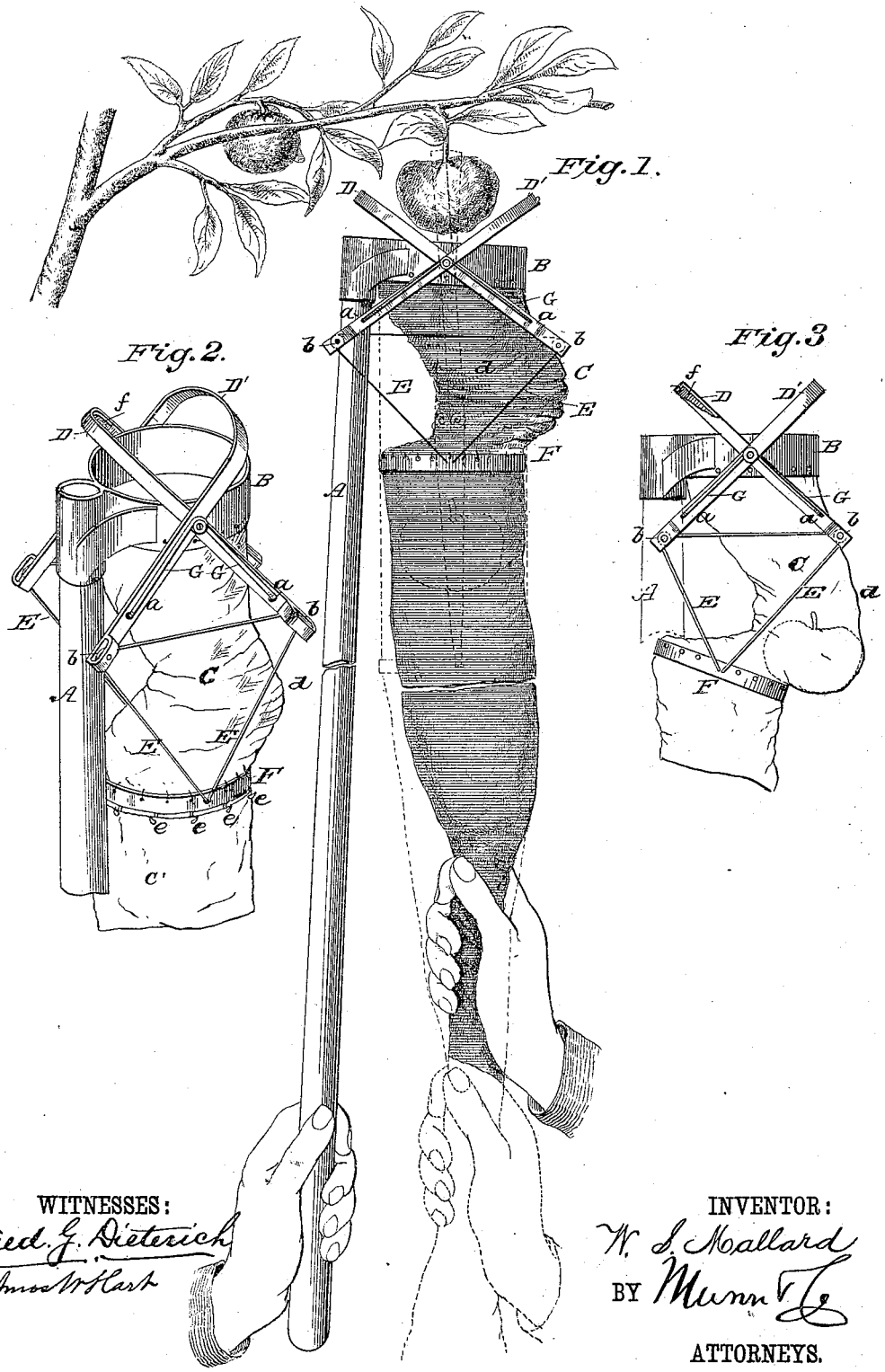
WITNESSES:
Fred G. Dieterich
Amos W. Hart
INVENTOR:
W. S. Mallard
BY Munn & Co.
ATTORNEYS.

UNITED STATES PATENT OFFICE.

WILLIAM S. MALLARD, OF DARIEN, GEORGIA.

FRUIT-PICKER.

SPECIFICATION forming part of Letters Patent No. 355,941, dated January 11, 1887.

Application filed December 19, 1885. Serial No. 186,223. (No model.)

*To all whom it may concern:*

Be it known that I, WILLIAM S. MALLARD, a citizen of the United States, residing at Darien, in the county of McIntosh and State of Georgia, have invented a new and useful Improvement in Fruit-Pickers, of which the following is a full, clear, and exact description.

My invention is an improvement in the class of fruit-pickers which consist, in general terms, of a long pole or handle, a device attached to it for use in severing the fruit from its stem or branch, and a bag or tube for receiving the fruit when severed.

My improvement consists in the several features of construction and combination of parts, hereinafter described and claimed.

In the accompanying drawings, Figures 1 and 3 are side views illustrating the practical use of the implement. Fig. 2 is a perspective view showing a modification of the tube or fruit-conductor.

Referring to Figs. 1, 3, on the upper end of the long pole or handle A is fixed a light steel band or ring, B, which projects horizontally from it. To this ring the long flexible tube or hose C, made of some light fabric, is attached by rivets or any other suitable means. The light steel blades or cutters D D', by which the stem of the fruit is severed, are semicircular in form and pivoted together to the sides of ring B. One of these blades is arranged to shut into the other, so that they act as shears. Their shanks *a a* extend below the pivots far enough to enable them to have the leverage required for efficient action, and their lower ends have small pulleys *b* attached, to relieve the friction of the cords E that operate the shears. One cord passes over the contiguous pulleys *b b* on one side and the other cord over pulleys on the other side of the shears and tube, as shown, and both cords are attached to a ring, F, that encircles and is secured to the tube C a short distance below the band B.

The shear-blades D D' are held normally open, as shown in full lines, by means of springs G, attached to them and to their pivots. These springs may, however, be variously constructed and arranged to effectuate the same result. When the shears are thus open, their lower ends are necessarily widely separated, and the cords E E necessarily raise the ring F and the attached tube C, so that the portion *d* of the latter between the rings B and G is "slack" or "baggy," as shown in Figs. 1, 3.

In practical use the pole A is held in the left hand and the lower end of the tube C in the right. The implement being then manipulated so that the fruit—say an apple, peach, or orange—hangs between the curved blades D D', the tube C is pulled quickly, by which, as shown in dotted lines, Fig. 1, the baggy portion *d* is straightened and the shears D D' closed, thus severing the stem of the fruit, which at once passes down the tube into the hand of the operator, or into a basket or other receptacle provided for the purpose. This is the usual operation of the device; but should it be desirable to sever the fruit and temporarily arrest its descent, (as, for example, when the basket or other receptacle is already full,) then by instantly releasing the tube C after a pull the fruit may be caught in the baggy portion *d*, as shown in Fig. 3, and retained therein until it can be allowed to descend with safety or convenience.

I show in Fig. 2 a modification in which the lower ring, F, is adapted for attachment of tubes C of different lengths. The attachment is in this instance effected by means of hooks *e*, formed on or attached to ring F, or sewed on the tubes; but of course other devices may offer like convenience in use.

Tubes of different lengths are required, according to the height of trees, of the kind of fruit to be picked, or other conditions.

In case the ring F is dispensed with, the cords E E will be attached to the tube itself.

In Fig. 2 a relatively-thick piece of wood, cork, or rubber, *f*, is shown riveted to the under side of the inner cutting-blade, D, for the purpose of preventing the stem of the fruit from being cut too short, or contact of the latter with the cutters.

What I claim is—

1. In a fruit-picker, the combination of cords E with the tube and devices for severing fruit from the stem, substantially as described, whereby pulling on the tube operates said devices, as specified.

2. In a fruit-picker, the combination of a handle, A, a ring fixed on its upper end, a fruit-conveying tube attached to said ring, and a spring connected with the tube for holding a portion of it normally slack, as shown and described.

3. In a fruit-picker, the cords E E, in combination with the tube, and the shanks of the cutters having friction-rollers applied thereto, as shown and described.

4. In a fruit-picker, the combination of cords E and spring G with the shears, the handle A, a ring fixed on the same, and the tube attached to said ring and cords, as shown and described.

5. In a fruit-picker, the ring F, in combination with the cutters and tube C, and means connected with the latter for operating the cutters, as shown and described.

WILLIAM S. MALLARD.

Witnesses:
HENRY S. RANARD,
McD. DUNWADY.